US012698046B2

(12) United States Patent

Sun et al.

(10) Patent No.: US 12,698,046 B2

(45) Date of Patent: Aug. 4, 2026

(54) DOUBLE-TRACTION TRANSFER VEHICLE

(71) Applicant: Jiangsu Zhengjin Special Vehicle Manufacturing Co., Ltd., Xuzhou (CN)

(72) Inventors: Houdong Sun, Xuzhou (CN); Yang Sun, Xuzhou (CN)

( * ) Notice: Subject to any disclaimer, the term of this patent is extended or adjusted under 35 U.S.C. 154(b) by 805 days.

(21) Appl. No.: 18/070,247

(22) Filed: Nov. 28, 2022

(65) Prior Publication Data

US 2023/0415525 A1     Dec. 28, 2023

(51) Int. Cl.
B60D 1/167 (2006.01)
B62D 53/08 (2006.01)
(52) U.S. Cl.
CPC ............. B60D 1/167 (2013.01); B62D 53/08 (2013.01)
(58) Field of Classification Search
CPC ........ B60D 1/167; B60D 1/015; B60D 1/173; B60D 1/665; B62D 53/08; B62D 53/0864; Y02W 30/56
See application file for complete search history.

(56) References Cited

U.S. PATENT DOCUMENTS

| 4,759,563 | A | * | 7/1988 | Nash | B62D 53/0807 |
| | | | | | 414/362 |
| 5,775,714 | A | * | 7/1998 | Meadows | B60D 1/143 |
| | | | | | 280/491.4 |
| 6,056,309 | A | * | 5/2000 | Brown | B60D 1/07 |
| | | | | | 280/447 |
| 2009/0250901 | A1 | * | 10/2009 | Lundin | B62D 53/0857 |
| | | | | | 280/442 |
| 2015/0210131 | A1 | * | 7/2015 | Sallis, Sr. | B60D 1/155 |
| | | | | | 280/442 |

FOREIGN PATENT DOCUMENTS

DE          3134301 A1 *   4/1983   ............. B60D 1/173

* cited by examiner

*Primary Examiner* — Alentin Neacsu
*Assistant Examiner* — Marlon A Arce

(57) ABSTRACT

The invention relates to a double-traction transfer vehicle used for trailers, comprising a front traction mechanism, two traction bars arranged in a cross, and a transfer frame connected with the trailer and provided with a running device, one end of each traction bar near the front traction mechanism is connected to the front traction mechanism by the retractor, and one end of each traction bar near the transfer frame is hinged to the transfer frame, the top of the transfer frame is provided with a saddle for connection to the trailer. The invention can meet the transportation requirements of one tractor pulling multiple trailers, greatly reduce the cost of equipment for vehicle purchase and labor costs, alleviate the road blockage pressure caused by the operation of multiple tractors wherein each tractor only pull one trailer at the same time, and improve the efficiency of the vehicle for transporting goods.

6 Claims, 7 Drawing Sheets

DOUBLE-TRACTION TRANSFER VEHICLE

1. TECHNICAL FIELD

The invention relates to the technical field of vehicle traction, in particular to a double-traction transfer vehicle used for trailers.

2. BACKGROUND ART

Now, China has become a rapidly developing economy in the world, and its total amount of cargo transportation is huge, the trailer as is a mainstream transport vehicle, due to its large size, in most cases, one tractor is towing one trailer in order to facilitate steering during driving, as shown in FIG. 1, which leads to the number of trailers to be used at the same time is the same as the number of tractors to be used and the need for a corresponding number of drivers, which not only increases equipment costs, but also increases labor costs, and at the same time, multiple tractors tow trailers to transport goods, it may cause interference with each other, poor transportation, and affect the transportation efficiency of goods.

3. SUMMARY OF THE INVENTION

The technical problem to be solved by the invention is to overcome the defects of the above-mentioned technologies and provide a double-traction transfer vehicle for trailers.

A double-traction transfer vehicle, comprising a front traction mechanism, two traction bars arranged in a cross, and a transfer frame connected with the trailer and provided with a running device, one end of each traction bar near the front traction mechanism is connected to the front traction mechanism by the retractor, and one end of each traction bar near the transfer frame is hinged to the transfer frame, the top of the transfer frame is provided with a saddle for connection to the trailer.

Further, the front traction mechanism includes a first connecting steel pipe, and the side of the first connecting steel pipe away from the traction bars is provided with two symmetrical second connecting steel pipes perpendicular to the first connecting steel pipe, both ends of the first connecting steel pipe are provided with retractor mounting seats, and the two retractors are respectively connected to the retractor mounting seats.

Further, the traction bar includes a horizontal bar, and one end of the horizontal bar close to the transfer frame is widened to one side to form a widened part, the widened part is provided with a first hinged circular hole whose axis is vertically arranged, one end of the horizontal bar near the retractor is provided with a bending part, the bending direction of the bending part is consistent with the widening direction of the widened part, one end of the bending part away from the horizontal bar is provided with a horizontal connecting part parallel to the horizontal bar, and the horizontal connecting part is provided with the second hinged circular hole.

Further, an intermediate hinge rod is hinged at one end of the transfer frame close to the traction bar, one side of the intermediate hinge rod near the traction bar is provided with two sets of connecting ear plates, each set of connecting ear plates is provided with a pin corresponding to the first hinged circular hole, the pin is located in the first hinged circular hole.

Further, the running device is wheel running.

Further, one end of the transfer frame away from the traction rods is provided with a tail light plate.

Further, the first connecting steel pipe is angular, and the two second connecting steel pipes are connected to the tip side of the angular first connecting steel pipe.

The advantages of the invention: the invention has reasonable design and convenient application, can meet the transportation requirements of one tractor pulling multiple trailers, greatly reduce the cost of equipment for vehicle purchase and labor costs, and alleviate the road blockage pressure caused by the operation of multiple tractors wherein each tractor only pull one trailer at the same time, and improve the efficiency of the vehicle for transporting goods.

4. BRIEF DESCRIPTION OF ACCOMPANY DRAWINGS

Figure 1:
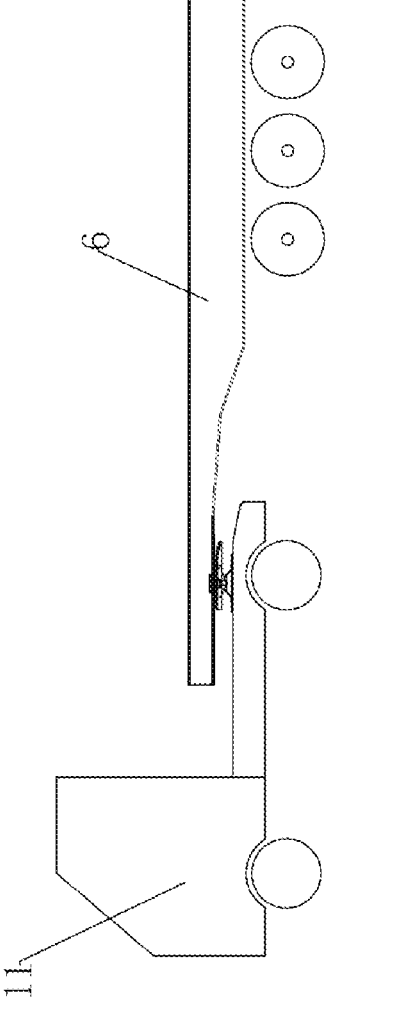
FIG. 1 is the schematic diagram of an existing tractor pulling a trailer.
Figure 2:
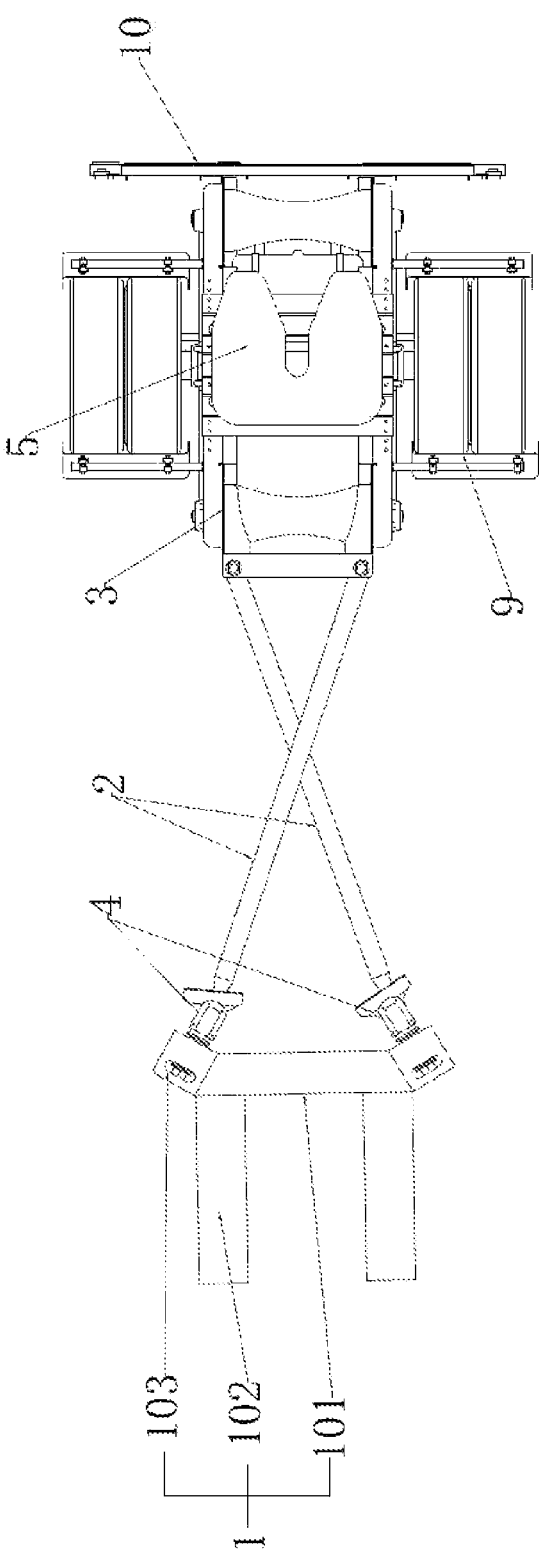
FIG. 2 is the schematic diagram of the top view of the first embodiment of a double-traction transfer vehicle of the invention.
Figure 3:
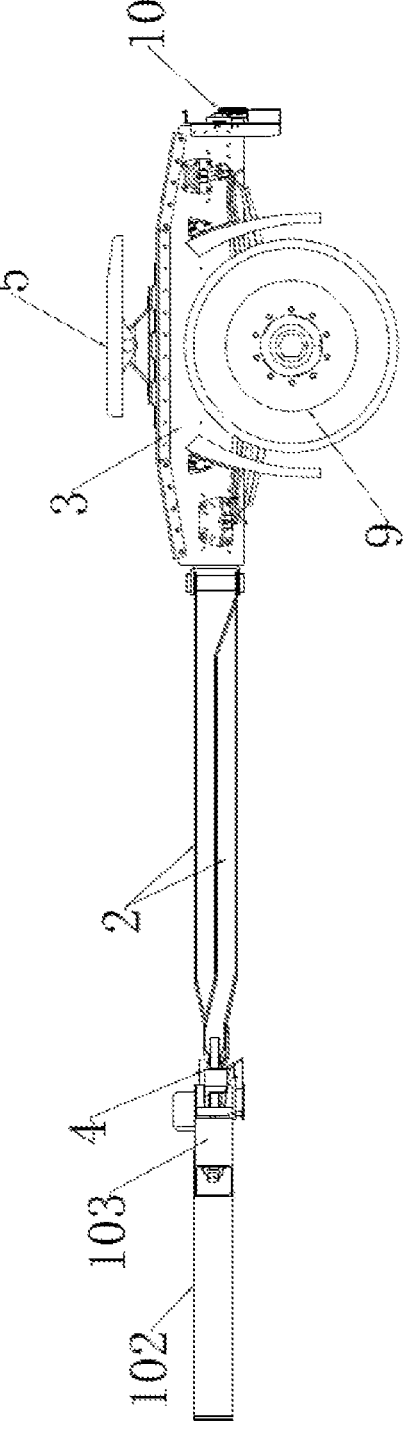
FIG. 3 is the schematic diagram of the side view of the embodiment of FIG. 2.
Figure 4:
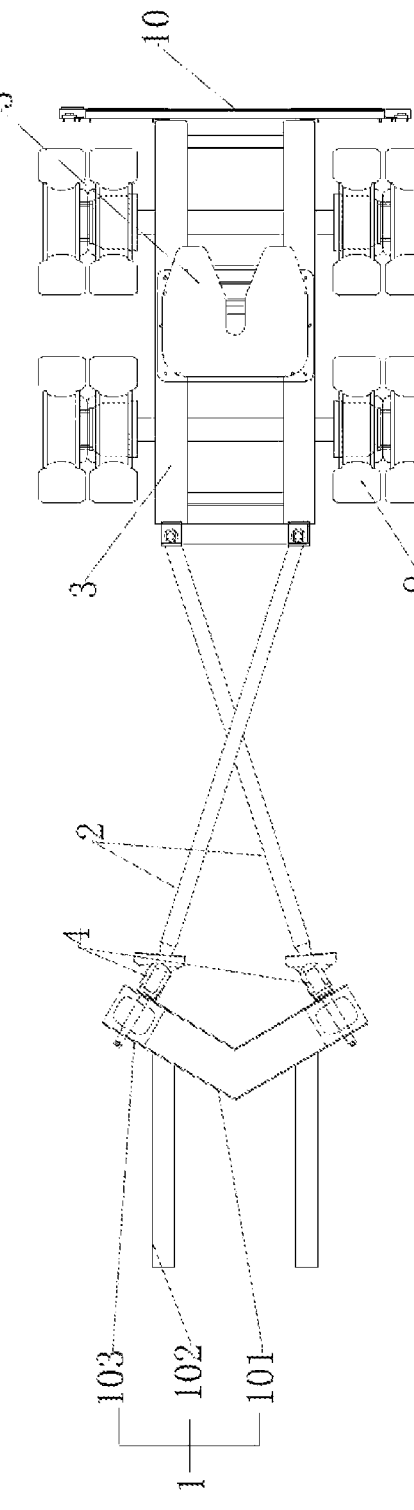
FIG. 4 is the schematic diagram of the top view of the second embodiment of a double-traction transfer vehicle of the invention.
Figure 5:
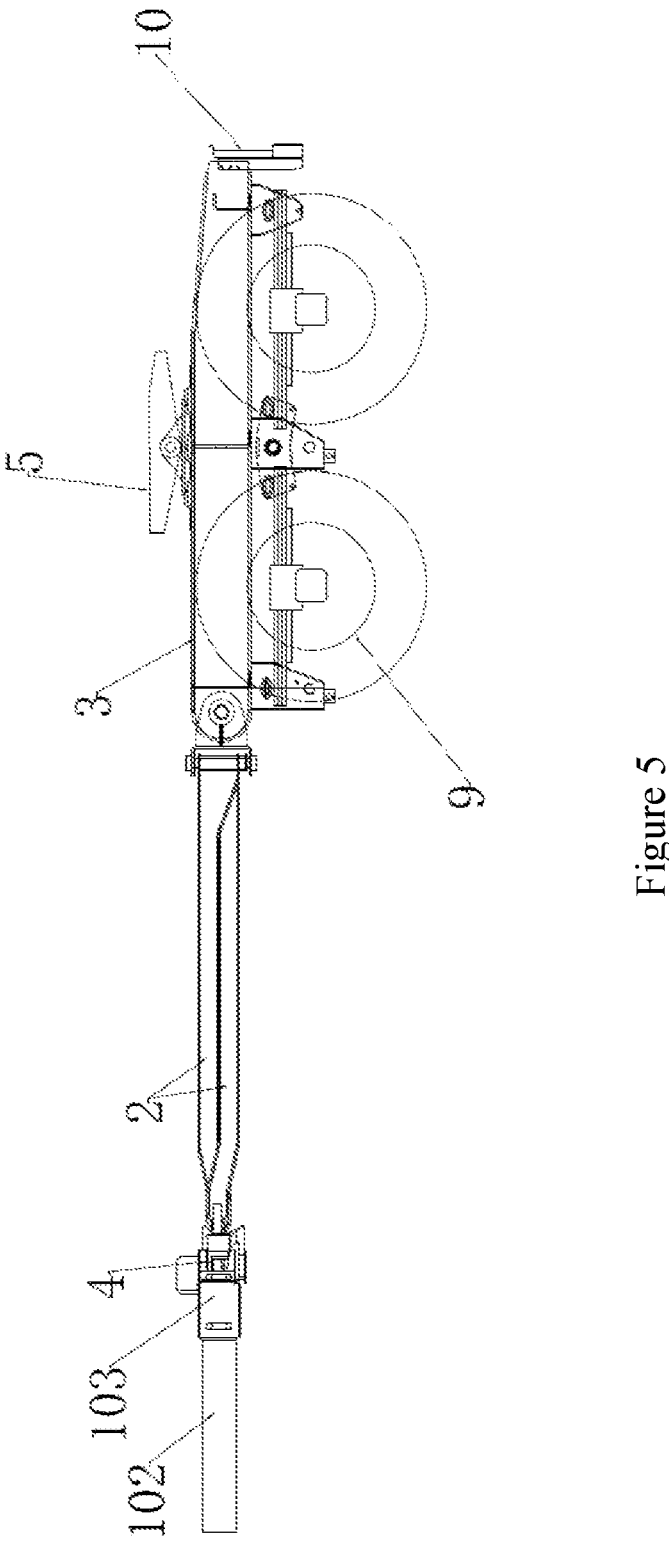
FIG. 5 is the schematic diagram of the side view of the embodiment of FIG. 4.

As shown in the accompanying drawings: 1 front traction mechanism; 2 traction bar; 3 transfer frame; 4 retractor; 5 saddle; 6 trailer; 7 connecting ear plate; 8 pin; 9 running device; tail light plate; 11 tractor; 101 first connecting steel pipe; 102 second connecting steel pipe; 103 retractor mounting seat; 201 horizontal bar; 202 widened part; 203 first hinged circular hole; 204 bending part; 205 horizontal connecting part; 206 second hinged circular hole; 301 intermediate hinge rod.

5. SPECIFIC EMBODIMENT OF THE INVENTION

The invention will be further described in detail below in combination with the accompanying drawings.

A double-traction transfer vehicle, comprising a front traction mechanism 1, two traction bars 2 arranged in a cross, and a transfer frame 3 connected with the trailer 6 and provided with a running device 9, one end of each traction bar 2 near the front traction mechanism 1 is connected to the front traction mechanism 1 by the retractor 4, and one end of each traction bar 2 near the transfer frame 3 is hinged to the transfer frame 3, the top of the transfer frame 3 is provided with a saddle 5 for connection to the trailer 6.

The front traction mechanism 1 includes a first connecting steel pipe 101, and the side of the first connecting steel pipe 101 away from the traction bars 2 is provided with two symmetrical second connecting steel pipes 102 perpendicular to the first connecting steel pipe 101, both ends of the first connecting steel pipe 101 are provided with retractor mounting seats 103, and the two retractors 4 are respectively connected to the retractor mounting seats 103.

Figure 6:
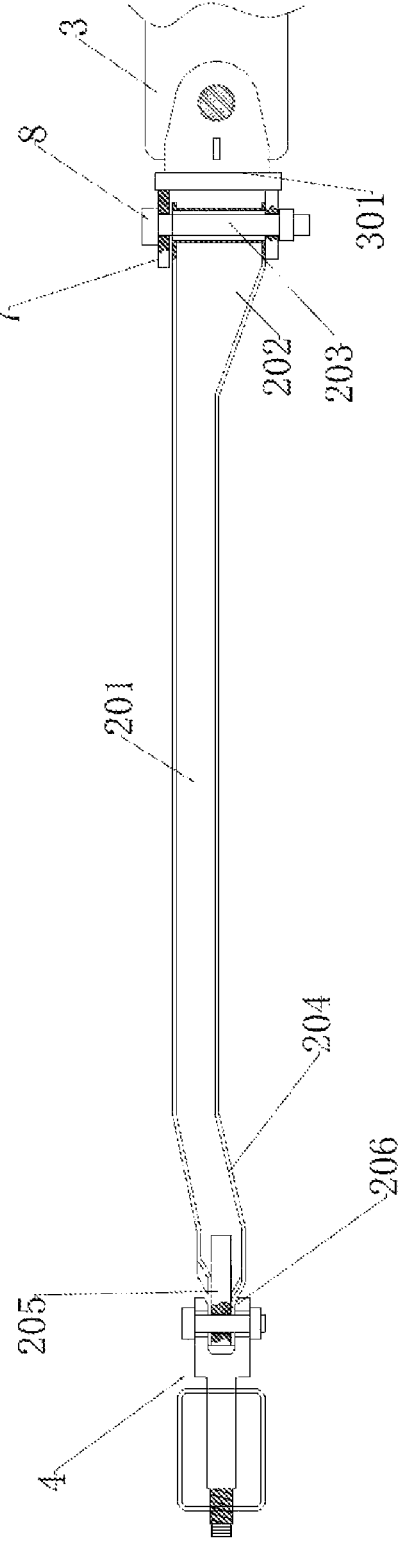
FIG. 6 is the schematic diagram of the traction bar of a double-traction transfer vehicle of the invention.
Figure 7:
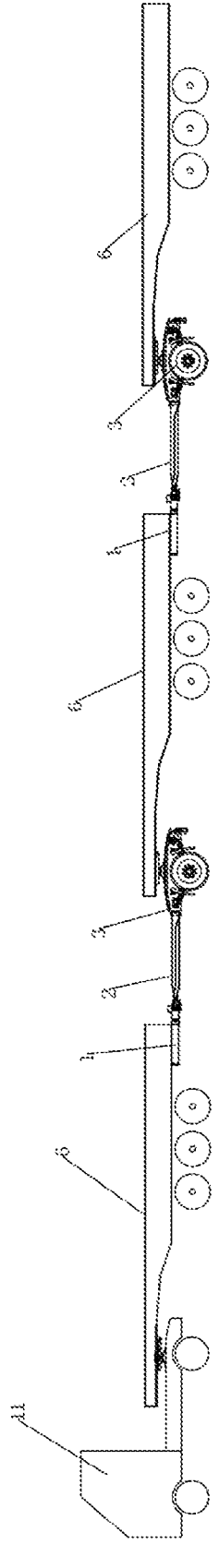
FIG. 7 is the schematic diagram of a tractor connecting multiple trailers according to the invention.

As shown in FIG. 6, the traction bar 2 includes a horizontal bar 201, and one end of the horizontal bar 201 close to the transfer frame 3 is widened to one side to form a widened part 202, the widened part 202 is provided with a first hinged circular hole 203 whose axis is vertically arranged, one end of the horizontal bar 201 near the retractor 4 is provided with a bending part 204, the bending direction of the bending part 204 is consistent with the widening direction of the widened part 202, one end of the bending part 204 away from the horizontal bar 201 is provided with a horizontal connecting part 205 parallel to the horizontal bar 201, and the horizontal connecting part 205 is provided with the second hinged circular hole 206.

An intermediate hinge rod 301 is hinged at one end of the transfer frame 3 close to the traction bar 2, one side of the intermediate hinge rod 301 near the traction bar 2 is provided with two sets of connecting ear plates 7, each set of connecting ear plates 7 is provided with a pin 8 corresponding to the first hinged circular hole 203, the pin 8 is located in the first hinged circular hole 203.

The running device 9 is wheel running.

One end of the transfer frame 3 away from the traction rods 2 is provided with a tail light plate 10.

The first connecting steel pipe 101 is angular, and the two second connecting steel pipes 102 are connected to the tip side of the angular first connecting steel pipe 101.

In the specific embodiment of the invention, the second connecting steel pipes 102 of the front traction mechanism 1 is welded under the tail of the front trailer 6, and the rear trailer 6 is connected through the saddle 5 on the transfer frame 3, and the continuous connection of multiple rear trailers can be realized successively;

The retractor 4 of each double-traction transfer vehicle is installed at the retractor mounting seat 103 of the front traction mechanism 1, and the retractor mounting seat is connected to the retractor 4 by the second hinged circular hole 206 of the traction bar 2, the first hinged circular hole 203 at the other end of the traction bar 2 is connected to ear plates 7 at the front end of the transfer frame 3 through the pin 8, when the two traction bars 2 are installed, they are installed crosswise, in addition, the widening directions of the widened parts 202 of the two traction bars 2 and the bending directions of the bending parts 204 are arranged opposite to each other;

In the invention, the transfer frames can rotate freely around the internal pins of the retractors through the crossed double-traction rods, and can also control the separation or connection of the transfer frames and the front traction mechanisms through the characteristics of the retractors; the rear trailers are installed on the saddles of the transfer frames, the trailers can rotate freely around the inner mounting holes of the saddles, and the connection or separation of the rear trailers and the transfer frames is controlled by the saddles, during the normal driving process of the front tractor, the rear trailers can well follow the movement through the invention, because the transfer frames can freely rotate around the inner pins of the retractors and the rear trailers can freely rotate around the inner mounting holes of the saddles, when the front tractor turns, the rear trailers can follow the turn and pass through the turning intersection.

The invention and its embodiments have been described above, and this description is not restrictive, what is shown in the accompanying drawings is only one of the embodiments of the invention, and the actual structure is not limited to this. All in all, if those of ordinary skill in the art are inspired by it, without departing from the purpose of creation of the invention, without creatively designing structural modes and embodiments similar to the technical scheme, all should belong to the protection scope of the invention.

The invention claimed is:

1. A double-traction transfer vehicle, comprising a front traction mechanism (1), two traction bars (2) arranged in a cross, and a transfer frame (3) connected with a trailer (6) and provided with a running device (9), one end of each traction bar (2) near the front traction mechanism (1) is connected to the front traction mechanism (1) by a retractor (4), t and one end of each traction bar (2) near the transfer frame (3) is hinged to the transfer frame (3), a top of the transfer frame (3) is provided with a saddle (5) for connection to the trailer (6);

the traction bar (2) includes a horizontal bar (201), and one end of the horizontal bar (201) close to the transfer frame (3) is widened to one side to form a widened part (202), the widened part (202) is provided with a first hinged circular hole (203) whose axis is vertically arranged, one end of the horizontal bar (201) near the retractor (4) is provided with a bending part (204), the bending direction of the bending part (204) is consistent with the widening direction of the widened part (202), one end of the bending part (204) away from the horizontal bar (201) is provided with a horizontal connecting part (205) parallel to the horizontal bar (201), and the horizontal connecting part (205) is provided with the second hinged circular hole (206).

2. The double-traction transfer vehicle of claim 1, the front traction mechanism (1) includes a first connecting steel pipe (101), and the side of the first connecting steel pipe (101) away from the traction bars (2) is provided with two symmetrical second connecting steel pipes (102) perpendicular to the first connecting steel pipe (101), both ends of the first connecting steel pipe (101) are provided with retractor mounting seats (103), and every retractor is connected to the retractor mounting seats (103).

3. The double-traction transfer vehicle of claim 1, an intermediate hinge rod (301) is hinged at one end of the transfer frame (3) close to the traction bar (2), one side of the intermediate hinge rod (301) near the traction bar (2) is provided with two sets of connecting ear plates (7), each set of connecting ear plates (7) is provided with a pin (8) corresponding to the first hinged circular hole (203), the pin (8) is located in the first hinged circular hole (203).

4. The double-traction transfer vehicle of claim 1, the running device (9) is wheel running.

5. The double-traction transfer vehicle of claim 1, one end of the transfer frame (3) away from the traction rods (2) is provided with a tail light plate (10).

6. The double-traction transfer vehicle of claim 2, the first connecting steel pipe (101) is angular, and the two second connecting steel pipes (102) are connected to a tip side of the angular first connecting steel pipe (101).

\* \* \* \* \*